United States Patent
Wilson

(10) Patent No.: US 7,471,931 B2
(45) Date of Patent: Dec. 30, 2008

(54) SYSTEM AND METHOD FOR CONTROLLING TRANSCEIVERS BASED ON A LOCATION INDICATOR

(75) Inventor: Arlynn Wilson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 1094 days.

(21) Appl. No.: 10/668,413

(22) Filed: Sep. 23, 2003

(65) Prior Publication Data

US 2004/0116129 A1    Jun. 17, 2004

Related U.S. Application Data

(60) Provisional application No. 60/433,304, filed on Dec. 13, 2002, provisional application No. 60/433,489, filed on Dec. 13, 2002.

(51) Int. Cl.
*H04B 1/40* (2006.01)
(52) U.S. Cl. .................................... 455/88; 379/400
(58) Field of Classification Search ............ 455/88
See application file for complete search history.

(56) References Cited

U.S. PATENT DOCUMENTS

| | | | |
|---|---|---|---|
| 6,011,799 A * | 1/2000 | Kerstein et al. ......... | 370/422 |
| 6,246,716 B1 | 6/2001 | Schneider | |
| 6,393,052 B2 | 5/2002 | Sadjadpour et al. | |
| 6,418,372 B1 * | 7/2002 | Hofmann ................ | 701/209 |
| 6,480,487 B1 | 11/2002 | Wegleitner et al. | |
| 6,920,330 B2 * | 7/2005 | Caronni et al. ........ | 455/456.1 |
| 7,036,031 B2 * | 4/2006 | Takeuchi ................ | 713/323 |
| 2002/0019954 A1 * | 2/2002 | Tran ........................ | 713/600 |

OTHER PUBLICATIONS

Committee T1-Telecommunications, *Spectrally Compatible RT-Based ADSL*, T1E1.4/2000-321, pp. 1-8 (2000).
NRIC V Focus Group 3, *Remote Deployments of DSL: Advantages, Challenges, and Solutions*, NRIC, pp. 3-28, Dec. 14, 2001.
Schneider, et al., U.S. Patent Application, "Data Communications System and Method Capable of Limiting Effects of Crosstalk by Adjusting Transceiver Power Levels," filed Aug. 22, 2003.

* cited by examiner

*Primary Examiner*—Ramnandan Singh
(74) *Attorney, Agent, or Firm*—Thomas, Kayden, Horstemeyer & Risley, L.L.P.

(57) ABSTRACT

A system for controlling transceivers based on a location of the transceivers, as indicated by a location indicator, helps to reduce crosstalk interference in signals transmitted from central offices. The system utilizes a location indicator and logic. The location indicator is communicatively coupled to each of a plurality of transceivers and is indicative of whether the plurality of transceivers are located at an intermediate terminal or a central office. The logic is configured to control a physical layer of each of the transceivers based on the location indicator.

30 Claims, 6 Drawing Sheets

SYSTEM AND METHOD FOR CONTROLLING TRANSCEIVERS BASED ON A LOCATION INDICATOR

CROSS-REFERENCE TO RELATED APPLICATION

This document claims priority to and the benefit of the filing date of copending and commonly-assigned U.S. Provisional Application No. 60/433,304, entitled "System and Method for Controlling Transceivers Based on a Location Indicator," and filed Dec. 13, 2002, which is incorporated herein by reference. This document also claims priority to and the benefit of the filing date of copending and commonly-assigned U.S. Provisional Application No. 60/433,489, entitled "Data Communication System and Method Capable of Limiting Effects of Crosstalk by Adjusting Transceiver Power Levels," and filed Dec. 13, 2002, which is incorporated herein by reference.

BACKGROUND OF THE INVENTION

1. Field of the Invention

The present invention generally relates to the field of telecommunication and, in particular, to a system and method for controlling transceivers based on a location of the transceivers as indicated by a location indicator.

2. Related Art

In a typical telecommunication system, transceivers at a central office usually communicate over one or more communication connections, sometimes referred to as "subscriber lines," to remote transceivers located at various customer premises. Network service providers strategically deploy multiple central offices in an effort to keep the lengths of the communication connections between the central office transceivers and the remote transceivers within a desirable or specified range. Moreover, as the demand for network services increases, network service providers typically add more equipment at the central offices and/or add more central offices.

In some situations, a network service provider will add a remote terminal, also referred to as "an intermediate terminal," which is often smaller than a central office. Transceivers at an intermediate terminal, like transceivers at a central office, communicate over one or more communication connections to transceivers located at various customer premises. However, as compared to central office transceivers, an intermediate terminal transceiver is typically located closer to its corresponding customer premises transceiver. Indeed, transceivers at a central office usually communicate with customer premises transceivers over distances up to approximately four miles, whereas transceivers at an intermediate terminal typically communicate with customer premises transceivers over distances less than approximately two miles.

In some instances, communication connections from an intermediate terminal are located within a close proximity of communication connections from a central office. For example, communication connections from an intermediate terminal may be bound within the same binder or cable as communication connections from a central office. In such instances, crosstalk from transceivers at the intermediate terminal may significantly interfere with signals transmitted by transceivers at the central office.

In this regard, crosstalk from a transceiver at the intermediate terminal typically travels shorter distances and is, therefore, less attenuated than crosstalk from a transceiver at the central office. As a result, crosstalk from the transceiver at the intermediate terminal is often at a significantly higher power level than crosstalk from the transceiver at the central office. This higher power level for the crosstalk from the intermediate terminal transceiver often exacerbates the adverse effects of crosstalk interference for the signals transmitted from the central office transceiver. In fact, crosstalk from the intermediate terminal transceiver may cause the signal-to-noise ratio of signals from the central office transceiver to fall below acceptable levels.

SUMMARY OF THE INVENTION

Generally, the present invention provides a system and method for controlling transceivers based on a location of the transceivers as indicated by a location indicator.

A system in accordance with an embodiment of the present invention utilizes a location indicator and logic. The location indicator is communicatively coupled to each of a plurality of transceivers and is indicative of whether the plurality of transceivers are located at an intermediate terminal or a central office. The logic is configured to control a physical layer of each of the transceivers based on the location indicator.

A system in accordance with another embodiment of the present invention utilizes a first transceiver residing and a location indicator. The first transceiver resides at a premises and is coupled to a feeder distribution interface (FDI). The first transceiver is further configured to communicate with a remote transceiver through the FDI based on a set of operational control settings. The location indicator is indicative of whether a distance from the first transceiver to the FDI is substantially less than a distance from a central office transceiver to the FDI, wherein the first transceiver is further configured to establish its set of operational control settings based on the location indicator.

A method in accordance with an embodiment of the present invention can be broadly conceptualized by the following steps: providing a transceiver; transmitting, to the transceiver, data indicating whether the transceiver is located at an intermediate terminal or a central office; and controlling a physical layer of the transceiver based on the data.

A method in accordance with another embodiment of the present invention can be broadly conceptualized by the following steps: transmitting a signal from a transceiver to a feeder distribution interface (FDI); indicating, via a location indicator, whether a distance from the transceiver to the FDI is substantially less than a distance from a central office transceiver to the FDI; and controlling a physical layer of the first transceiver based on the location indicator such that an amount of crosstalk interfering with signals transmitted by the central office transceiver is reduced.

Various features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally pertains to a system and method for controlling transceivers based on the location of the transceivers as indicated by a location indicator. In a preferred embodiment of the present invention, a location indicator is maintained at a site where one or more transceivers are installed and operated. The location indicator preferably indicates whether the site is a central office or an intermediate terminal. A transceiver at the site preferably reads the location indicator and controls its operation based on the location indicator. If the location indicator indicates that the site is an intermediate terminal, then the transceiver adjusts its operation in an effort to reduce crosstalk in signals communicated from central offices. As an example, the transceiver may reduce its signal power level and/or may adjust (e.g., narrow) its bandwidth such that the crosstalk by the transceiver is less likely to interfere with signals transmitted from one or more transceivers at a central office.

Figure 1:
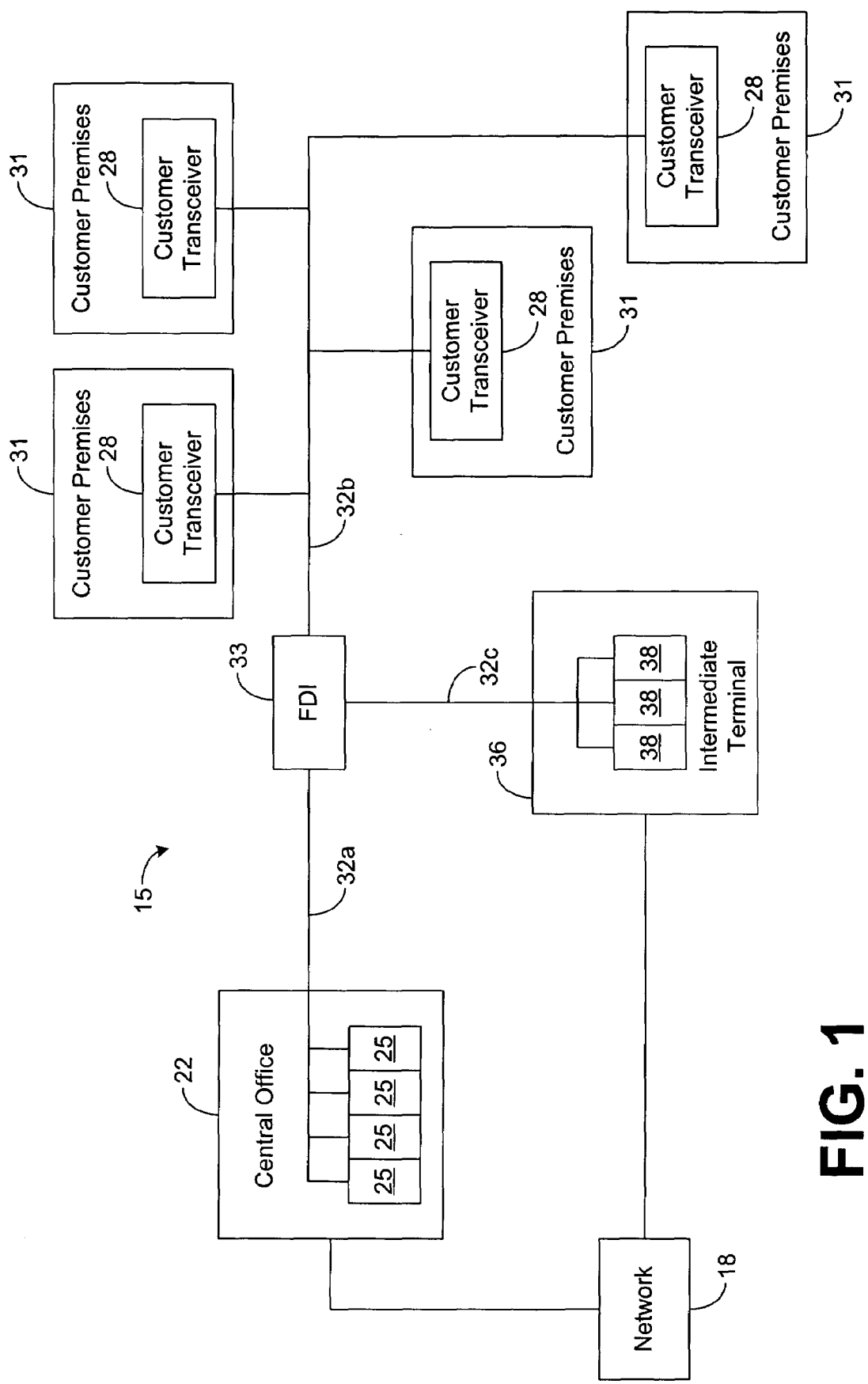
FIG. 1 is a block diagram illustrating a communication system in accordance with the prior art.

FIG. 1 depicts a conventional communication system 15 enabling communication with a network 18, which may comprise one or more known networks, such as the publicly switched telephone network (PSTN) or Internet, for example. As shown by FIG. 1, the system 15 comprises a central office 22. One or more central office transceivers 25 are located at the premises of the central office 22 and communicate with various remote transceivers 28, referred to as "customer transceivers," residing at one or more customer premises 31. The central office transceivers 25 communicate with the customer transceivers 28 over multiple cables or binders 32a and 32b that are interconnected via a feeder distribution interface (FDI) 33, as shown by FIG. 1. Each cable 32a-32c may comprise multiple communication connections (not specifically shown) separately insulated for allowing multiple signals to be simultaneously transmitted through the cable 32a-32c. Each such connection may comprise copper wires, sometimes referred to as a "twisted pair," or some other type of known or future-developed transmission medium.

During operation, signals from the network 18 are routed to the central office transceivers 25, which communicate the signals to the customer transceivers 28 via known techniques. Signals transmitted from the customer transceivers 28 are received by the central office transceivers 25, which pass such signals to the network 18. The network 18 then routes the signals to their appropriate destination, which may be another transceiver (not specifically shown) serviced by another central office (not specifically shown).

In an effort to satisfy increasing demand by customers, a network service provider may construct an intermediate terminal 36 and install one or more intermediate terminal transceivers 38 at the premises of the intermediate terminal 36. Similar to the central office transceivers 25, the intermediate terminal transceivers 38 may communicate with one or more of the customer transceivers 28 over multiple cables or binders 32b and 32c that are interconnected via the feeder distribution interface 33.

Moreover, it is common for signals from both the central office transceivers 25 and the intermediate terminal transceivers 38 to be communicated through the same cable at the far-end of a subscriber line. More specifically, it is common for signals transmitted from one or more of the central office transceivers 25 and from one or more of the intermediate terminal transceivers 38 to be simultaneously communicated through cable 32b. As a result, far-end crosstalk (FEXT) may occur within the foregoing cable 32b. Such crosstalk generally degrades the signal-to-noise ratios of signals transmitted from the intermediate terminal transceivers 38 and the central office transceivers 25. Typically, for at least the reasons set forth below, the effects of such crosstalk are more pronounced for the signals transmitted from the central office transceivers 25 than for the intermediate terminal transceivers 38.

In this regard, the intermediate terminal 36 and, therefore, the intermediate terminal transceivers 38 are typically located closer to the customer transceivers 28 shown by FIG. 1 than the central office 22 and, therefore, the central office transceivers 25. As a result, a signal transmitted from a remote transceiver 38 typically exhibits a higher power level within the cable 32b than a signal transmitted from a central office transceiver 28. Thus, crosstalk distortions are generally more significant for the signals transmitted from the central office transceivers 25 than for the signals transmitted from the intermediate terminal transceivers 38. Indeed, in some circumstances, crosstalk induced by one or more of the intermediate terminal transceivers 38 causes the signal-to-noise ratio for one or more of the signals transmitted from the central office transceivers 25 to fall below acceptable levels. Maintaining an acceptable signal-to-noise ratio is desirable in order for a service provider to furnish adequate service to its customers.

Figure 2:
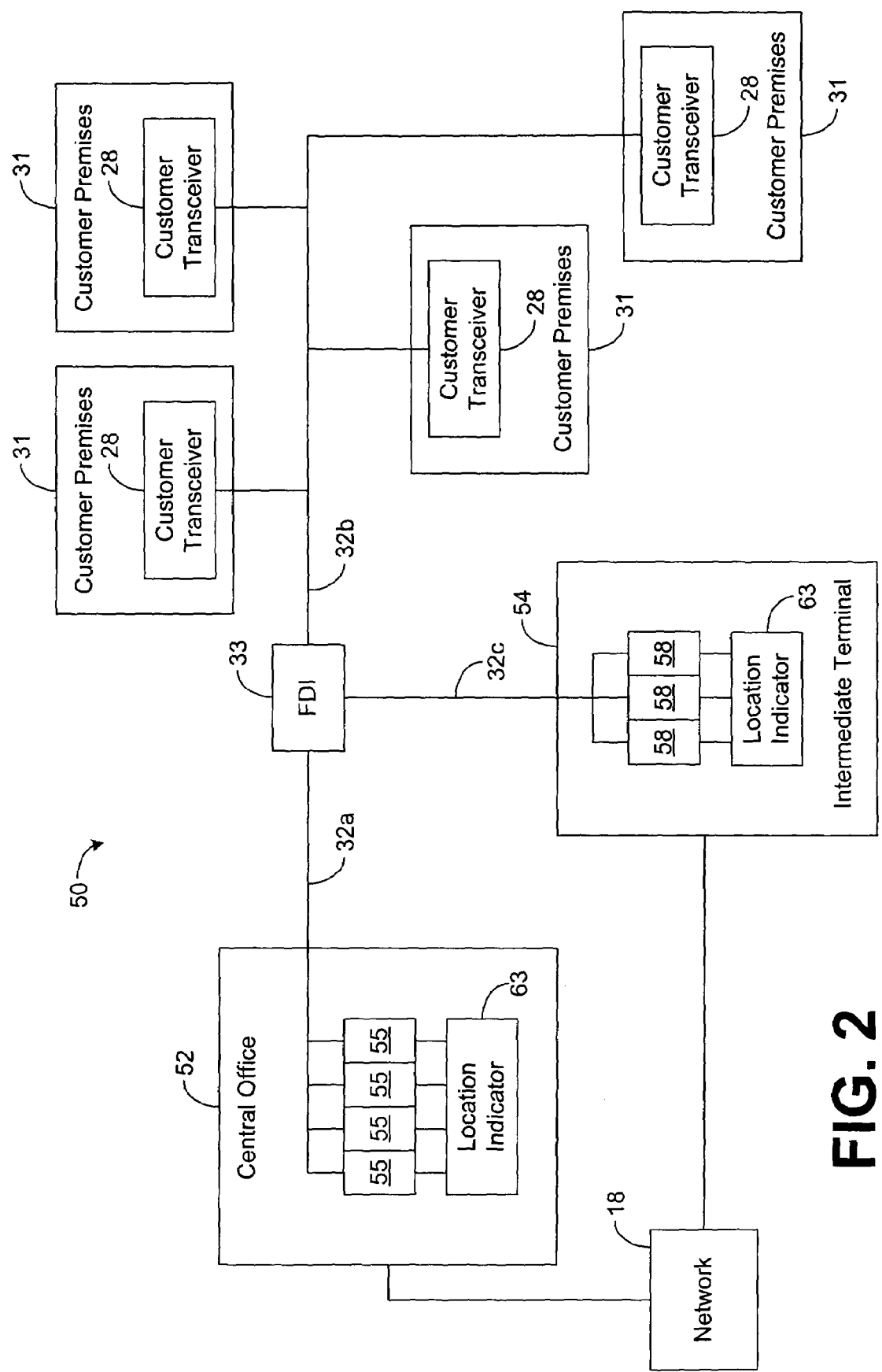
FIG. 2 is a block diagram illustrating a communication system in accordance with an exemplary embodiment of the present invention.

A system in accordance with a preferred embodiment of the present invention enables automatic adjusting of transceivers at intermediate terminals in order to reduce crosstalk induced by such transceivers and affecting signals transmitted from transceivers residing at other locations, such as central offices, for example. In this regard, FIG. 2 depicts a communication system 50 in accordance with the preferred embodiment of the present invention. Similar to the conventional system 15 depicted by FIG. 1, the system 50 comprises a central office 52 and an intermediate terminal 54 having transceivers 55 and 58, respectively, that communicate with various customer transceivers 28 residing at one or more customer premises 31.

The intermediate terminal 54 and its transceivers 58 are preferably located significantly closer to the customer transceivers 28 than the central office 52. For example, the central office 52 may be located approximately four miles from the customer transceivers 28, whereas the intermediate terminal 54 may be located any distance up to approximately two miles from the customer transceivers 28. Note that other distances from the customer transceivers 28 for the central office 52 and the intermediate terminal 54 are possible in other embodiments.

Similar to the embodiment shown by FIG. 1, each of the central office transceivers 55 may be coupled to and exchange data with one or more customer transceivers 28, and each of the intermediate terminal transceivers 58 also may be coupled to and exchange data with one or more customer transceivers 28. Signals transmitted by the customer transceivers 28 and received by a transceiver 55 or 58 are passed to the network 18. Such signals may then be routed to one or more transceivers (not specifically shown) serviced by another central office or intermediate terminal (not specifically shown).

In addition, the network 18 may route, to the central office 52, signals destined for any of the customer transceivers 28 coupled to a central office transceiver 55, and the network 18 may route, to the intermediate terminal 54, signals destined for any of the customer transceivers 28 coupled to an intermediate terminal transceiver 58. When the central office 52 receives a signal destined for one of the customer transceivers 28, the central office transceiver 55 coupled to such customer transceiver 28 transmits the signal to the customer transceiver 28. Similarly, when the intermediate terminal 54 receives a signal destined for one of the customer transceivers 28, the intermediate terminal transceiver 58 coupled to such customer transceiver 28 transmits the signal to the customer transceiver 28.

Note that the central office transceivers 55 may initially be configured identical to the intermediate terminal transceivers 58. Moreover, if desired, any of the transceivers 58 may be removed from the intermediate terminal 54 and implemented at the central office 52 as a central office transceiver 55. Furthermore, if desired, any of the transceivers 55 may be removed from the central office 52 and implemented at the intermediate terminal 54 as an intermediate terminal transceiver 58. In the preferred embodiment, each of the transceivers 55 and 58 is initially configured to operate as if the transceiver is located at a central office 52. Thus, each transceiver 55 and 58 is initially configured to communicate via techniques known in the art for communicating over local loops.

Furthermore, in the preferred embodiment, a location indicator 63 resides at one or more sites of the central office transceivers 55 and/or the intermediate terminal transceivers 58. Each location indicator 63 preferably indicates whether it is located at a central office 52 or an intermediate terminal 54. For example, each location indicator 63 may be a one bit indicator, which is set to a first state (e.g., a logical high) if the indicator 63 is residing at a central office 52 and which is set to a second state (e.g., a logical low) if the indicator 63 is residing at an intermediate terminal 54.

Note that the location indicator 63 may be implemented in hardware and/or software. As an example, in one embodiment, the location indicator 63 may be a mechanical switch (e.g., relay). In such an embodiment, the location indicator 63 may be set to one position (e.g., open) if the indicator 63 is located at a central office 52, and the location indicator 63 may be set to another position (e.g., closed) if the indicator 63 is located at an intermediate terminal 54.

In another embodiment, the location indicator 63 may comprise an electrical pin that may be set to one electrical state (e.g., an electrical high) if the indicator 63 is located at a central office 52, and the pin may be set to another electrical state (e.g., an electrical low) if the indicator 63 is located at an intermediate terminal 54. In yet another embodiment, the location indicator 63 may comprise a data value stored in memory. This data value may be a one bit value that is set to one logical state (e.g., a logical high) if the indicator 63 is located at a central office 52 and that is set to another logical state (e.g., a logical low) if the indicator 63 is located at an intermediate terminal 54. Alternatively, this data value may be a multi-bit value that is set to one value if the indicator 63 is located at a central office 52 and that is set to another value if the indicator 63 is located at an intermediate terminal 54. Note that other implementations of the location indicator 63 are possible in other embodiments.

In the preferred embodiment, each of the central office transceivers 55 is communicatively coupled to the location indicator 63 residing at the central office 52 and discovers the state of this indicator 63. As set forth above, the state of this location indicator 63 should be set to indicate that it and, therefore, the transceivers 55 coupled to it are residing at a central office 52 rather than an intermediate terminal 54. Based on this indicator 63, each of the central office transceivers 55 determines that it is located at a central office 52. Since the transceivers 55 and 58 are initially configured, in the preferred embodiment, to operate as if they were located at a central office, the transceivers 55 preferably do not alter their configuration in response to the location indicator 63.

In addition, each of the intermediate terminal transceivers 58 is communicatively coupled to the location indicator 63 residing at the intermediate terminal 54 and discovers the state of this indicator 63. As set forth above, the state of this location indicator 63 should be set to indicate that it and, therefore, the transceivers 58 coupled to it are residing at an intermediate terminal 54 rather than a central office 52. Based on this indicator 63, each of the intermediate terminal transceivers 63 determines that it is located at an intermediate terminal 54. Moreover, in response to the foregoing indicator 63, each of the transceivers 58 adjusts its configuration and, therefore, its operation in order to reduce crosstalk induced by the transceiver 58 and affecting signals transmitted from the central office transceivers 55.

In this regard, as set forth above, signals transmitted from intermediate terminals typically travel shorter distances and, therefore, experience less attenuation than signals transmitted from central offices. As a result, when the signals from intermediate terminals and signals from central offices are transmitted in the same binder or cable, the signals from the intermediate terminals are often at a higher power level thereby inducing more significant crosstalk interference in the signals transmitted from a central office. However, the transceivers 58 of the preferred embodiment compensate for this difference by adjusting their configurations upon detection of the location indicator's state in an effort to reduce the foregoing crosstalk interference. Note that there are various adjustments that may be made by the transceivers 58 to achieve this effect. As will be described in more detail below, the transceivers 58 of the preferred embodiment adjust or control their physical layer such that crosstalk induced by the transceivers 58 and affecting signals from the central office transceivers 55 is reduced.

As an example, each transceiver 58 maybe configured to reduce its signal power level such that the power level difference between the signals transmitted by the central office transceivers 55 and the intermediate terminal transceivers 54 is lower when such signals are transmitted in close proximity to one another along the cable 32b. In another embodiment, each transceiver 58 may be configured to adjust (e.g., narrow) its bandwidth.

For example, a customer may install a transceiver 28 of a particular type (e.g., ADSL, HDSL, etc.) and contract for network services at a specified data rate for the newly installed transceiver 28. According to current standards, a transceiver 55 installed at the central office 52 may be configured to communicate with the newly installed transceiver 28 within a particular bandwidth at or above the specified data rate. However, by virtue of being located closer to the newly installed transceiver 28, a transceiver 58 installed at the intermediate terminal 54 may be able to communicate with the newly installed transceiver 28 within a more narrow bandwidth at or above the specified data rate.

Therefore, if a transceiver for servicing the customer's transceiver 28 is installed at the intermediate terminal 54 instead of the central office 52, then the transceiver may be configured to adjust its bandwidth such that it communicates in a different bandwidth as compared to that of the central office transceivers 55. Accordingly, the effects of far-end crosstalk for the signals transmitted from the central office 52 may be decreased.

Figure 3:
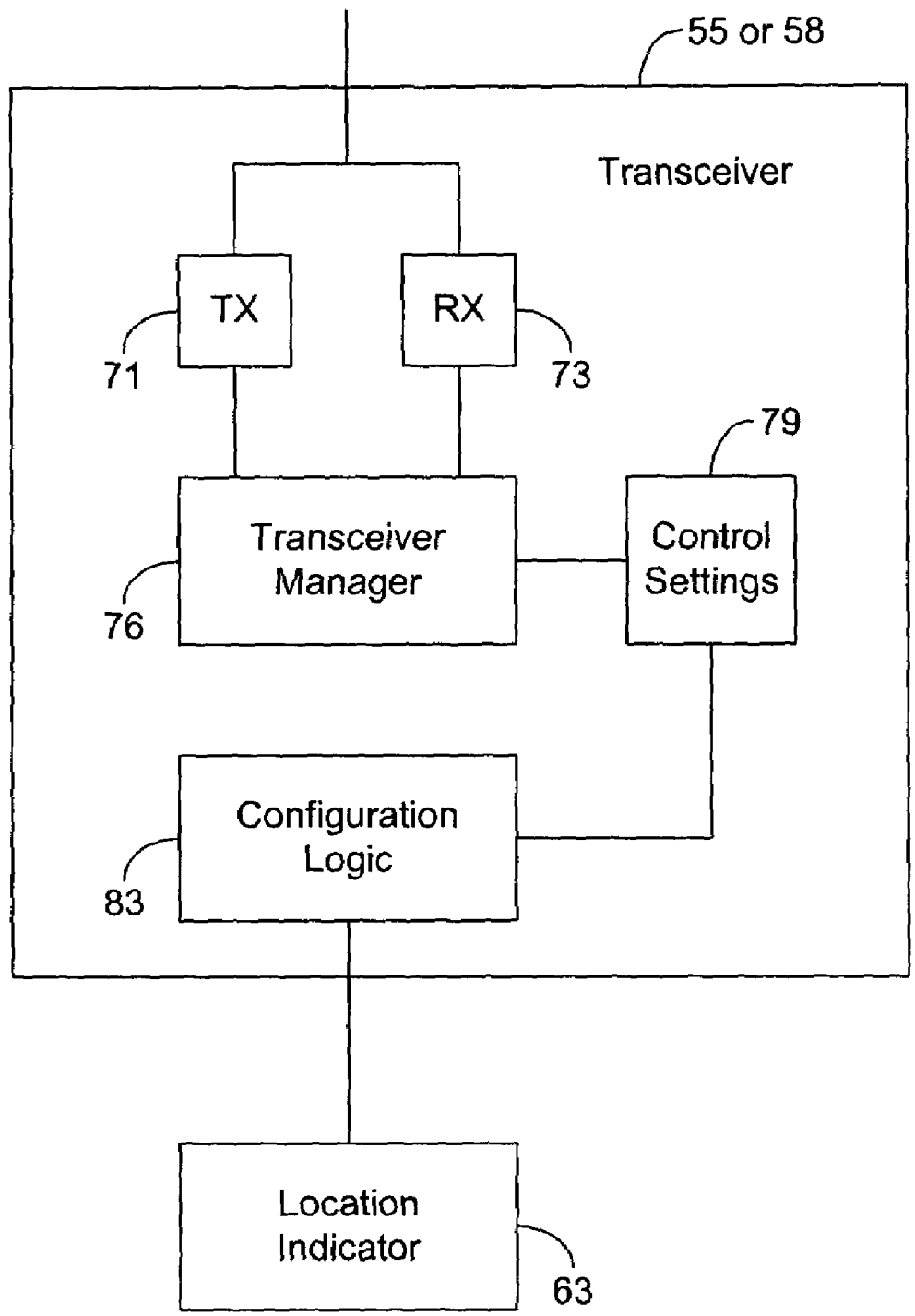
FIG. 3 is a block diagram illustrating a more detailed view of a transceiver depicted in FIG. 2.

FIG. 3 depicts a more detailed view of a transceiver 55 or 58 that may be installed at the central office 52 or the intermediate terminal 54 of FIG. 2. As shown by FIG. 3, the transceiver 55 or 58 comprises a transmitter 71 and a receiver 73 operating under the direction and control of a transceiver manager 76 in order to communicate with one or more customer transceivers 28. In this regard, the transceiver manager 76 preferably controls the operation of the transceiver 55 or 58 based on control settings 79 that are stored within the transceiver 55 or 58. The control settings 79 preferably indicate various physical layer parameters, such as bandwidth and signal power level, for example, for the transceiver 55 or 58.

Initially, the transceiver 55 or 58 may be configured to utilize a default set of control settings 79 for communicating with customer transceiver 28. However, configuration logic 83 within the transceiver 55 or 58 may adjust one or more of the control settings 79 based on the state of the location indicator 63 residing at the site of the transceiver 55 or 58. For example, in the preferred embodiment, if the location indicator 63 interfaced with the configuration logic 83 indicates that the location indicator 63 and, therefore, the transceiver 55 or 58 shown by FIG. 3 is residing at a central office 52, then the configuration logic 83 may refrain from adjusting the control settings 79. As a result, the transceiver manager 76 controls the operation of the transceiver 55 or 58 based on the default control settings 79 originally stored in the transceiver 55 or 58.

However, if the location indicator 63 interfaced with the configuration logic 83 indicates that the location indicator 63 and, therefore, the transceiver 55 or 58 shown by FIG. 3 is residing at an intermediate terminal 54, then the configuration logic 83 preferably adjusts the control settings 79. For example, the configuration logic 83 may adjust the control settings 79 such that transceiver 58 transmits at a lower signal power level. As set forth above, the transmission of a lower powered signal by the transceiver 58 at the intermediate terminal 54 may reduce crosstalk affecting signals transmitted from the central office 52.

In another example, the configuration logic 83 may adjust the control settings 79 such that the bandwidth of the transceiver 58 shown by FIG. 3 is changed in an effort to reduce crosstalk noise affecting signals transmitted from a central office 52. In other examples, the configuration logic 83 may change different communication parameters within the control settings 79 in an effort to reduce crosstalk noise affecting the signals transmitted from the central office 52.

It should be noted that the transceiver manager 76 and the configuration logic 83 may be implemented in software, hardware, or a combination thereof. Any portion of the transceiver manager 76 and/or the configuration logic 83, when implemented in software, can be stored and transported on any computer-readable medium for use by or in connection with an instruction execution system, apparatus, or device, such as a computer-based system, processor-containing system, or other system that can fetch and execute instructions.

In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, all or some of the logic for the transceiver manager 76 and/or the configuration manager 83 may be magnetically stored and transported on a conventional portable computer diskette.

It should be noted that the transceivers 55 and 58 of the preferred embodiment have been described above as being initially configured to communicate as if the transceivers 55 and 58 were to be implemented at a central office 52. As an example, each of the transceivers 55 and 58 may be initially configured to communicate at a power level and a bandwidth typically employed for communication of distances up to approximately four miles, the range typically serviced by central offices 52.

However, the initial configuration of the transceivers 55 and/or 58 in such a manner is not a necessary feature of the present invention. In this regard, the transceivers 55 and/or 58 may be initially configured to communicate as described above for the intermediate terminal transceivers 58 of the preferred embodiment. As an example, each of the transceivers 55 and 58 may be initially configured to communicate at a power level lower than that utilized by typical central office transceivers. In such embodiments, the configuration logic 83 is preferably configured to adjust the control settings 79 when the location indicator 63 interfaced with the logic 83 indicates that the transceiver is being implemented at a central office 52. In response to such a determination, the logic 83 preferably adjusts the control settings 79 such that the transceiver is configured to communicate as described above for central office transceivers 55 of the preferred embodiment.

Furthermore, it is not necessary for there to be a default set of control settings 79. In such an embodiment, the configuration logic 83 may be configured to set the control settings 79 of both central office transceivers 55 and intermediate terminal transceivers 58 based on the location indicator 63. In this regard, when the location indicator 63 of an installed transceiver indicates that the transceiver is installed at a central office 52, then the configuration logic 83 sets the control settings 79 such that transceiver operates as described above for central office transceivers 55 of the preferred embodiment. However, when the location indicator 63 of a transceiver indicates that the transceiver is installed at an intermediate terminal 54, then the configuration logic 83 sets the control settings 79 such that transceiver operates as described above for intermediate terminal transceivers 58 of the preferred embodiment.

It should be noted that various methodologies for setting the control settings 79 may be employed by the configuration logic 83. For example, the transceiver manager 76 may be configured to control the operation of its transceiver based on the values stored in certain areas of memory (e.g., control registers) within the transceiver. In such an embodiment, the configuration logic 83 may be configured to set the control settings 79 by storing the appropriate control values within the aforementioned memory locations so that the transceiver operates in the desired manner.

In another embodiment, the transceiver may initially store a first set of control values for controlling the transceiver as a central office transceiver 55, and the transceiver may initially store a second set of control values for controlling the transceiver as an intermediate terminal transceiver 58. In such an embodiment, the configuration logic 83 may then cause (e.g., instruct) the transceiver manager 76 to utilize the first set of control values, during operation, if the location indicator 63 indicates that the transceiver is located at a central office 52. If the location indicator 63 indicates that the transceiver is located at an intermediate terminal 54, then the configuration logic 83 may cause (e.g., instruct) the transceiver manager 76 to utilize the second set of control values during operation. Note that there are various other methodologies that may be employed by the configuration logic 83 to establish, based on the location indicator 63, the control settings 79 that are utilized by the transceiver manager 76 during operation for controlling the transceiver in the desired manner.

It should also be noted that, in general, the intermediate terminal 54, like the central office 52, is a site where network service providers implement transceivers for communicating with customer transceivers 28 over subscriber lines. The primary difference between a central office 52 and an intermediate terminal 54, for purposes of this disclosure, is that the central office 52 services customer transceivers 28 at significantly greater distances than an intermediate terminal 54. Therefore, the end-to-end communication links between the central office transceivers 55 and the customer transceivers 28 are, on average, substantially longer than the end-to-end communication links between the intermediate terminal transceivers 58 and the customer transceivers 28.

Indeed, in the preferred embodiment, the communication links between the central office transceivers 55 and the customer transceivers 28, which comprise cables 32a and 32b, have lengths up to approximately four miles. However, the communication links between the intermediate terminal transceivers 58 and the customer transceivers 28, which comprise cables 32b and 32c, have lengths up to approximately twelve-thousand (12,000) feet, although other lengths are possible in other embodiments.

Therefore, the location indicator 63 is effectively indicative of a desired or expected communication range for transceivers installed at the site of the location indicator 63. For example, in the preferred embodiment described above, the desired or expected communication range indicated by the location indicator 63 at the central office 52 is approximately four miles, and the desired or expected communication range indicated by the location indicator 63 at the intermediate terminal 54 is approximately twelve-thousand (12,000) feet. However, in other embodiments, the location indicator 63 may indicate other distances. Further, the location indicator 63 may comprise a data value representing the approximate average distance that the indicator 63 is located from the customer transceivers 28 that are serviced by transceivers at the site of the indicator 63. In yet another example, the location indicator 63 may comprise a data value representing the approximate distance that the indicator 63 is located from the central office 52 or the FDI 33. In such an example, the location indicator 63 may identify an intermediate terminal 54 if its data value exceeds a specified threshold.

Note that if information indicative of the distances from the central office 52 to the FDI 33 and from the remote terminal to the FDI 33 is provided to the transceivers 58 by the location indicator 63 or otherwise, then such distances may be used in determining a suitable power level or otherwise controlling the physical layer of one or more of the transceivers 58. Techniques for modifying the transmission behavior of the transceivers 58 based on the foregoing distances are described in more detail in commonly-assigned U.S. Provisional Application No. 60/433,489.

As described above, each of the transceivers 55 and 58 may communicate ADSL signals. However, if desired, the transceivers 55 and/or 58 may be configured to communicate via other types of protocols, such as, for example, HDSL (e.g., HDSL2, HDSL4), VDSL, or other types of known or future-developed protocols.

Furthermore, in the embodiments described above, the location indicator 63 utilized to indicate the location of a particular transceiver 55 or 58 resides at the premises of the particular transceiver 55 or 58. In this regard, the location indicator 63 utilized to indicate the location of intermediate terminal transceivers 58 resides at the intermediate terminal 54, and the location indicator 63 utilized to indicate the location of the central office transceivers 55 resides at the central office 52. However, such a feature is not necessary for implementing the present invention.

For example, in other embodiments, one or both of the location indicators 63 depicted in FIG. 2 may reside within the network 18 or may be communicatively coupled to the network 18. Data indicative of the status of the location indicator 63 may be transmitted via the network 18 to the central office 52 or the intermediate terminal 54, as appropriate, to notify the associated transceivers 55 or 58 of their location. Note that this data may be embedded in an operational control channel of the network 18, if desired, or the data may be transmitted over some other channel of the network 18. Based on the foregoing data, the associated transceivers 55 or 58 may determine their location and respond accordingly, as described above.

Figure 4:
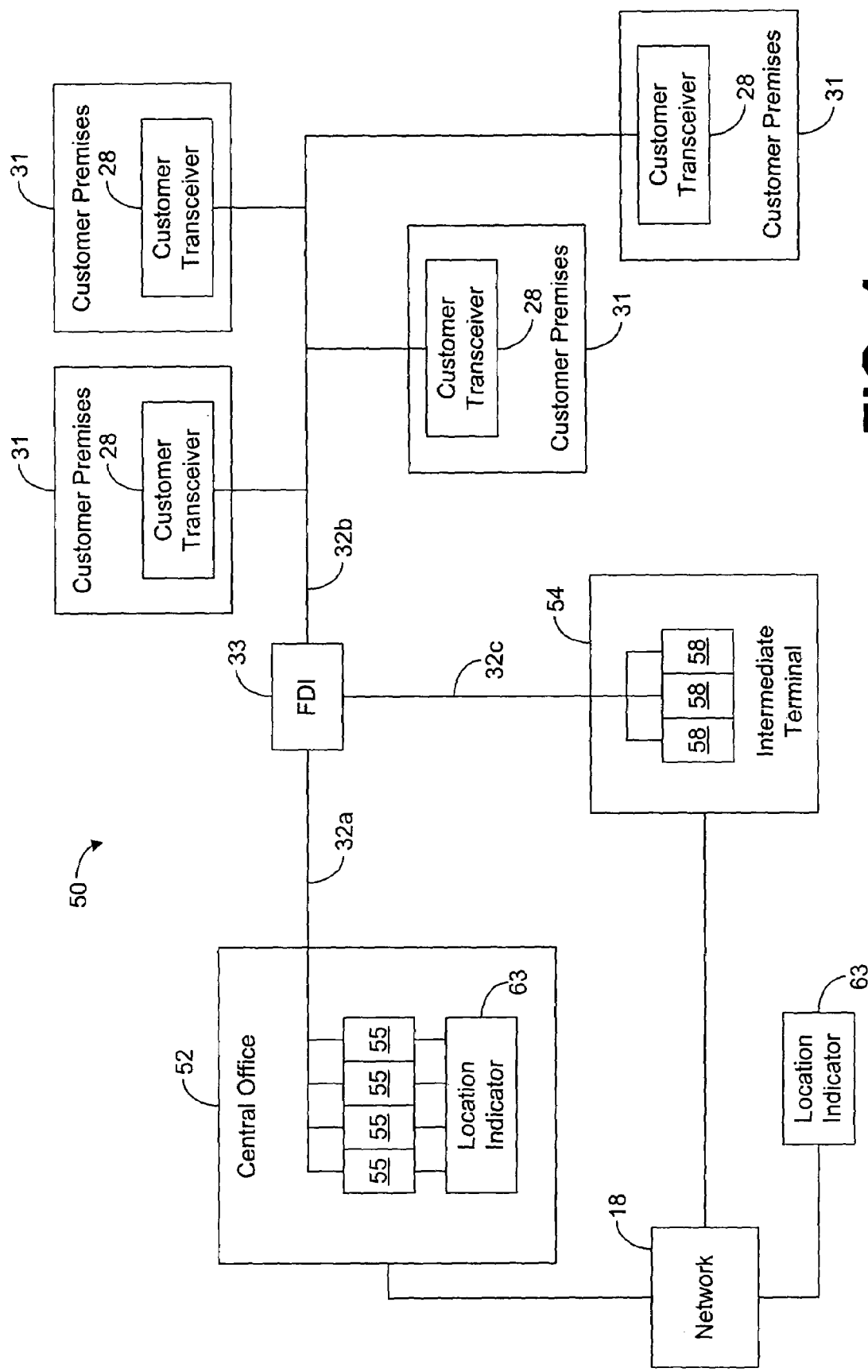
FIG. 4 is a block diagram illustrating a communication system in accordance with another exemplary embodiment of the present invention.

As an example, the location indicator 63 depicted within the intermediate terminal 54 in FIG. 2 may reside outside of the intermediate terminal 54 in other embodiments, as depicted in FIG. 4. Once the transceivers 58 are installed in the intermediate terminal 54, the foregoing location indicator 63 may transmit to the intermediate terminal 54 via the network 18 data indicating, to the transceivers 58, that they are implemented at an intermediate terminal. In response, the transceivers 58 may adjust their respective control settings 79, if necessary, such that they each operate, when communicating with customer transceivers 28, as described above for the preferred embodiment.

Operation

The preferred use and operation of the communication system 50 and associated methodology are described hereafter.

Figure 5:
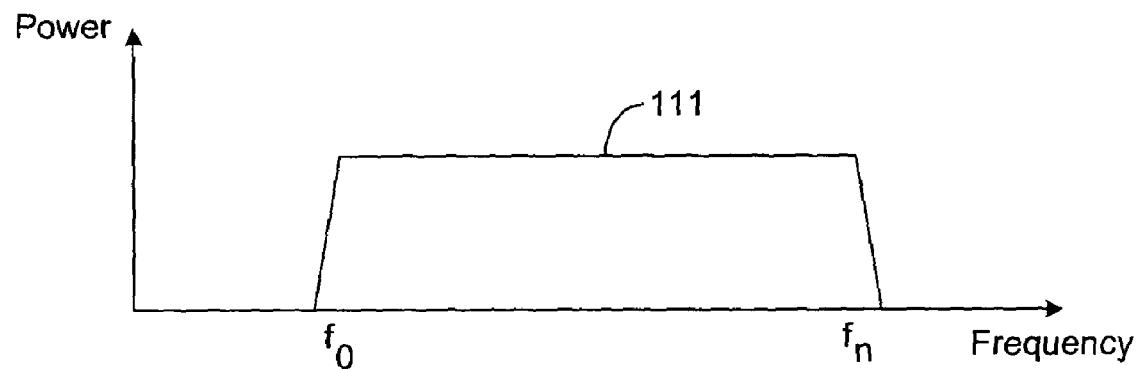
FIG. 5 is a graph illustrating an exemplary bandwidth for the transceiver of FIG. 3 when the transceiver is implemented at a central office.
Figure 6:
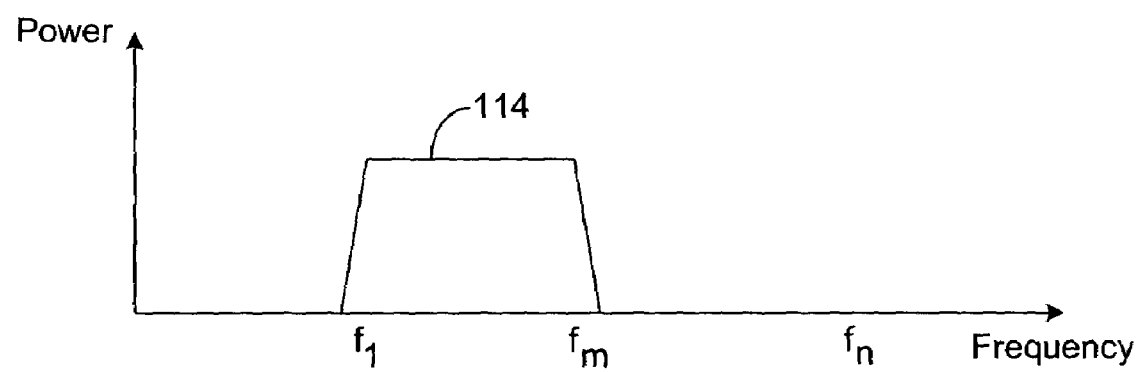
FIG. 6 is a graph illustrating an exemplary bandwidth for the transceiver of FIG. 3 when the transceiver is implemented at an intermediate terminal.

Assume, for illustrative purposes, that the transceiver depicted by FIG. 3 can be configured to communicate from a central office 52 at or above a specified data rate within a bandwidth 111, which extends from a frequency $f_0$ to a frequency $f_n$, as shown by FIG. 5. Further assume that the same transceiver may be configured to communicate from an intermediate terminal 54 at or above the specified data rate within smaller bandwidth 114, which extends from a frequency $f_1$ to a frequency $f_m$, where $f_m$ is lower than $f_n$, as shown by FIG. 6. Note that, in other examples, $f_m$ may be higher than $f_n$. Also assume that the transceiver manager 76 of the transceiver is initially configured to utilize a first set of control settings 79 that cause the transceiver to communicate within bandwidth 111.

Figure 7:
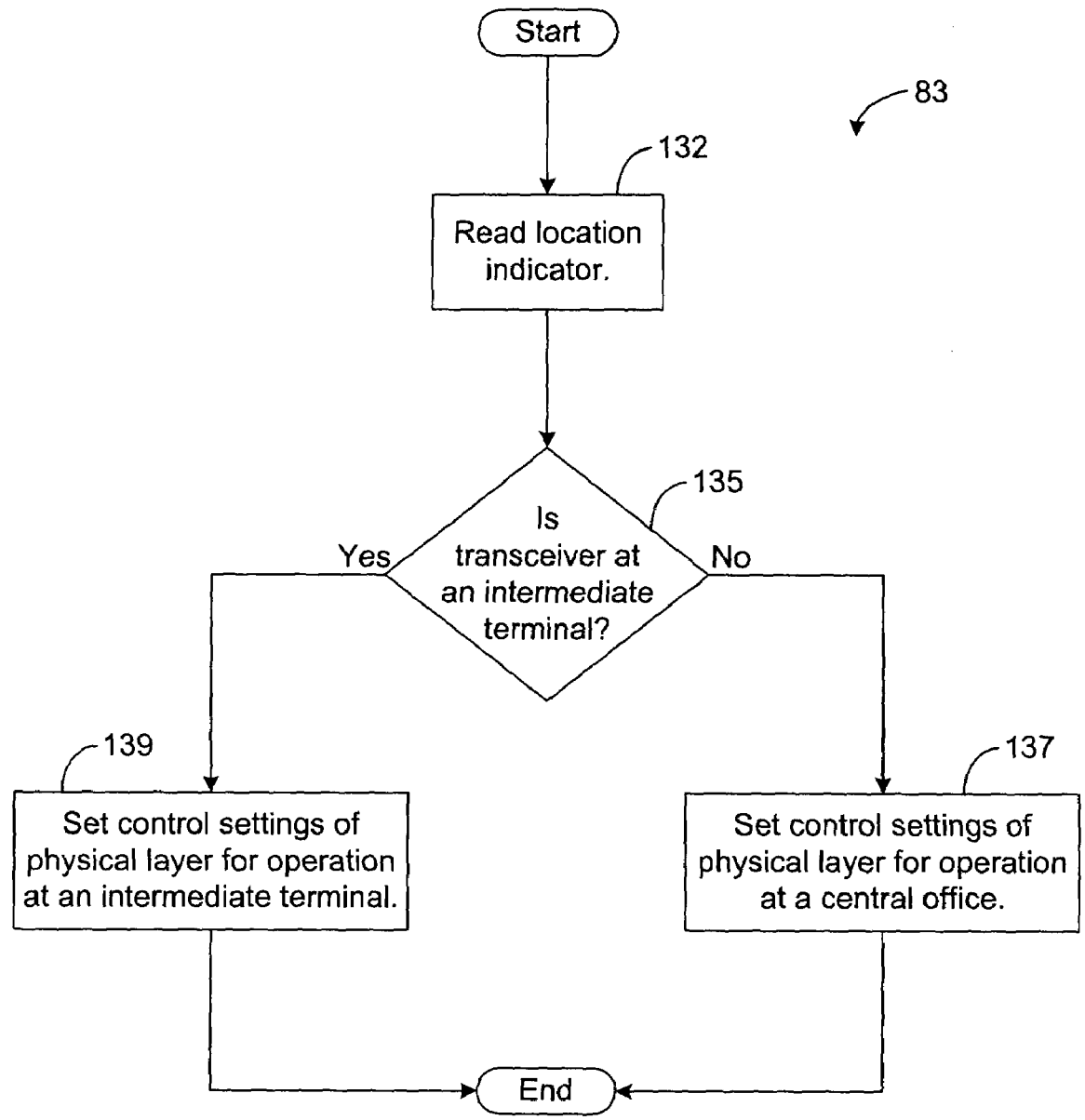
FIG. 7 is a flow chart illustrating an exemplary architecture and functionality of configuration logic depicted in FIG. 2.

In a first example, assume that the aforedescribed transceiver, which will be referred to in this example as "transceiver 55," is installed at the central office 52. Upon installation, the transceiver 55 reads the location indicator 63 residing at the central office 52 in block 132 of FIG. 7. Based on this location indicator 63, the configuration logic 83 determines that the transceiver 55 has been installed at a central office and, therefore, ensures that the control settings 79 utilized by the transceiver manager 76 to control the operation of the transceiver 55 are appropriately set for operation at a central office, as shown by blocks 135 and 137.

More specifically, the configuration logic 83 ensures that the control settings 79 are set such that the transceiver 55, during operation, communicates within the bandwidth 111 (FIG. 5). In the present example, the transceiver manager 76 is initially configured to utilize a set of control settings 79 that cause the transceiver 55 to communicate within the bandwidth 111. Therefore, it is not necessary for the configuration logic 83 to take any action in block 137. More specifically, it is not necessary for the configuration logic 83 to adjust the control settings 79 that are utilized by the transceiver manager 76 for controlling the operation of the transceiver 55.

Moreover, after performing block 137, the transceiver manager 76 may commence operation based on the control settings 79. Thus, the transceiver manager 76 may begin communicating with one or more customer transceivers 28 within the bandwidth 111 established by the control settings 79.

In another example, assume that the transceiver depicted by FIG. 3 is installed at the intermediate terminal 54 instead of the central office 52. In this example, the transceiver will be referred to as "transceiver 58." Upon installation, the transceiver 58 reads the location indicator 63 residing at the intermediate terminal 54 in block 132 of FIG. 7. Based on this location indicator 63, the configuration logic 83 determines that the transceiver 58 has been installed at an intermediate terminal and, therefore, ensures that the control settings 79 utilized by the transceiver manager 76 to control the operation of the transceiver 58 are appropriately set for operation at an intermediate terminal, as shown by blocks 135 and 139.

More specifically, the configuration logic 83 ensures that the control settings 79 are set such that the transceiver 55, during operation, communicates within the bandwidth 114 (FIG. 6). In the present example, the transceiver manager 76 is initially configured to utilize a set of control settings 79 that cause the transceiver 58 to communicate within the bandwidth 111. Thus, the configuration logic 83 preferably adjusts the control settings 79 utilized by the transceiver manager 76 for controlling the operation of the transceiver 58 such that the transceiver 58, during operation, communicates within bandwidth 114 instead of bandwidth 111.

Moreover, after performing block 139, the transceiver manager 76 may commence operation based on the control settings 79. Thus, the transceiver manager 76 may begin communicating with a customer transceiver 28 within the bandwidth 114 established by the control settings 79. Note that by adjusting the control settings. 79 in block 139, the configuration logic 83 effectively reduces crosstalk interference that may be occurring to signals transmitted from the central office 52.

In this regard, adjusting the control settings 79 such that the transceiver 58 communicates within bandwidth 114 instead of bandwidth 111 prevents the transceiver 58 from communicating within the frequency range extending from $f_m$ to $f_1$. Thus, any signals transmitted from the central office 52 within this frequency range should be substantially free of interference from crosstalk induced by the transceiver 58.

It should be noted that the aforedescribed operation of the system 50 has been described for illustrative purposes, and various modifications to the operation may be made without departing from the principles of the present invention. For example, in other embodiments, it is not necessary for the bandwidth 114 to coincide with the bandwidth 111, and in other embodiments, the configuration logic 83 may respond to the location indicator 63 read in block 132 differently. For example, the configuration logic 83 may adjust or establish the control settings 79 in order to control the signal power level of the transceiver's transmitter 71 in addition to or in lieu of controlling the transceiver's bandwidth. Furthermore, various other steps may be taken by the configuration logic 83 in an effort to control the transceiver's operation in a different manner based on the location indicator 63 read in block 132.

According to the techniques described herein, the physical layer of an intermediate terminal transceiver 58 is adjusted based on a location indicator 63. In this regard, the location indicator 63 preferably indicates whether the distance from the transceiver's site to an FDI 33 is substantially less than the distance from a central office transceiver 55 to the FDI 33 thereby indicating whether crosstalk noise from the signals of the transceiver 58 is likely to significantly interfere with signals transmitted by the central office trasnceiver 55. If the distance from the transceiver's site to the FDI 33 is indeed substantially less than the distance from the central office transceiver 55 to the FDI 33, then the intermediate ternaminal transceiver 58 preferably establishes its physical layer such that the signals transmitted by the intermediate terminal transceiver 58 are spectrally compatible with the signals transmitted by the central office transceiver 55.

It should be further emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Now, therefore, the following is claimed:

1. A communication system, comprising:
   a location indicator configured to provide an indication of whether a plurality of transceivers residing at a premise are located at an intermediate terminal of a telecommunication network; and
   logic configured to control a configuration of a physical layer of each of the transceivers based on the indication such that, for each of the transceivers, a transmit power level or a bandwidth is based on whether the indication indicates that the plurality of transceivers are located at the intermediate terminal.

2. The communication system of claim 1, wherein the location indicator is a one-bit indicator.

3. The communication system of claim 1, wherein the location indicator comprises a mechanical switch.

4. The communication system of claim 1, wherein the location indicator comprises an electrical pin.

5. The communication system of claim 1, wherein the location indicator comprises a data value stored in memory.

6. The communication system of claim 1, wherein the location indicator is remotely located from the plurality of transceivers.

7. The communication system of claim 6, wherein the telecommunication network is configured to transmit data indicative of the location indicator to the plurality of transceivers via an operational control channel of the telecommunication network.

8. The communication system of claim 1, wherein each of the transceivers is located at the intermediate terminal, wherein at least one of the transceivers is coupled to a remote transceiver via a cable, and wherein a transceiver at a central office of the telecommunication network is coupled to a remote transceiver via the cable.

9. The communication system of claim 8, wherein the logic is configured to establish a transmit power level or a bandwidth for the at least one transceiver based on the indication such that crosstalk introduced to signals communicated by the transceiver at the central office is reduced.

10. A communication system, comprising:
a first transceiver residing at a premise, the first transceiver coupled to a feeder distribution interface (EDI) of a telecommunication network and configured to communicate with a remote transceiver through the EDI based on a set of operational control settings; and
a location indicator configured to provide an indication of the first transceiver's proximity relative to the FDI,
wherein the first transceiver is further configured to establish its set of operational control settings based on the indication such that a transmit power level or a bandwidth of the first transceiver is based on the indicated proximity.

11. The communication system of claim 10, wherein the location indicator is a one-bit indicator.

12. The communication system of claim 10, wherein the location indicator comprises a mechanical switch.

13. The communication system of claim 10, wherein the location indicator comprises an electrical pin.

14. The communication system of claim 10, wherein the location indicator comprises a data value stored in memory.

15. The communication system of claim 10, wherein the first transceiver is coupled to the remote transceiver via a cable between the FDI and the remote transceiver, wherein the system further comprises a second transceiver coupled to the FDI and coupled to a remote transceiver via the cable.

16. The communication system of claim 15, wherein the first transceiver is configured to establish its set of operational control settings based on the indication such that crosstalk introduced to a signal transmitted by the second transceiver is reduced.

17. A communication system, comprising:
a plurality of transceivers residing at a premise; and
means for indicating whether the plurality of transceivers are located at an intermediate terminal of a telecommunication network, the indicating means configured to provide, to each of the plurality of transceivers, an indication of whether the plurality of transceivers are located at the intermediate terminal,
wherein each of the plurality of transceivers comprises a means for controlling the respective transceiver based on the indication such that a transmit power level or a bandwidth of the respective transceiver is based on whether the indication indicates that the plurality of transceivers are located at the intermediate terminal.

18. A communication method, comprising the steps of:
providing a transceiver;
transmitting, to the transceiver, data indicating a proximity of the transceiver relative to a feeder distribution interface (FDI) of a telecommunication network; and
controlling a configuration of a physical layer of the transceiver based on the data such that a transmit power level or a bandwidth of the transceiver is based on the proximity indicated by the data.

19. The communication method of claim 18, wherein the data is based on a state of a mechanical switch.

20. The communication method of claim 18, wherein the data is based on an electrical pin.

21. The communication method of claim 18, further comprising the step of retrieving the data from memory.

22. The communication method of claim 18, further comprising the step of transmitting a signal from the transceiver to a remote transceiver, wherein the controlling step comprises the step of controlling a frequency of the signal based on the data.

23. The communication method of claim 18, further comprising the step of transmitting a signal from the transceiver to a remote transceiver, wherein the controlling step comprises the step of controlling a power level of the signal based on the data.

24. The communication method of claim 18, further comprising the step of transmitting a signal from the transceiver to a remote transceiver, wherein the controlling step comprises the step of controlling a power level of the transceiver as a function of frequency of the signal.

25. The communication method of claim 18, further comprising the step of transmitting a signal from the transceiver through the FDI, wherein the controlling step is performed based on the data such that crosstalk introduced to a signal transmitted through the FDI by a transceiver at a central office of the telecommunication network is reduced.

26. A communication method, comprising the steps of:
transmitting a signal from a first transceiver to a feeder distribution interface (FDI) of a telecommunication network;
indicating a proximity of the first transceiver relative to the FDI; and
controlling a configuration of a physical layer of the first transceiver based on the proximity indicated by the indicating step such that an amount of crosstalk interfering with signals transmitted by a second transceiver at a central office of the telecommunication network is reduced.

27. The communication method of claim 26, wherein the signal transmitted from the first transceiver is transmitted through a cable, and wherein the method further comprises the step of transmitting a signal from the second transceiver through the cable.

28. The communication method of claim 26, wherein the controlling step comprises the step of controlling, based on the proximity indicated by the indicating step, a frequency of the signal transmitted by the first transceiver.

29. The communication method of claim 26, wherein the controlling step comprises the step of controlling, based on the proximity indicated by the indicating step, a power level of the signal transmitted by the first transceiver.

30. The communication method of claim 26, further comprising the step of transmitting data indicative of the proximity over an operational control channel of the telecommunication network, wherein the controlling step is based on the data.

* * * * *